Aug. 30, 1966  W. F. REYNOLDS ETAL  3,269,891
FIXING DRY STRENGTH RESIN ON FIBERS BY ALUM IN
THE PRESENCE OF A BUFFER
Filed Aug. 31, 1965
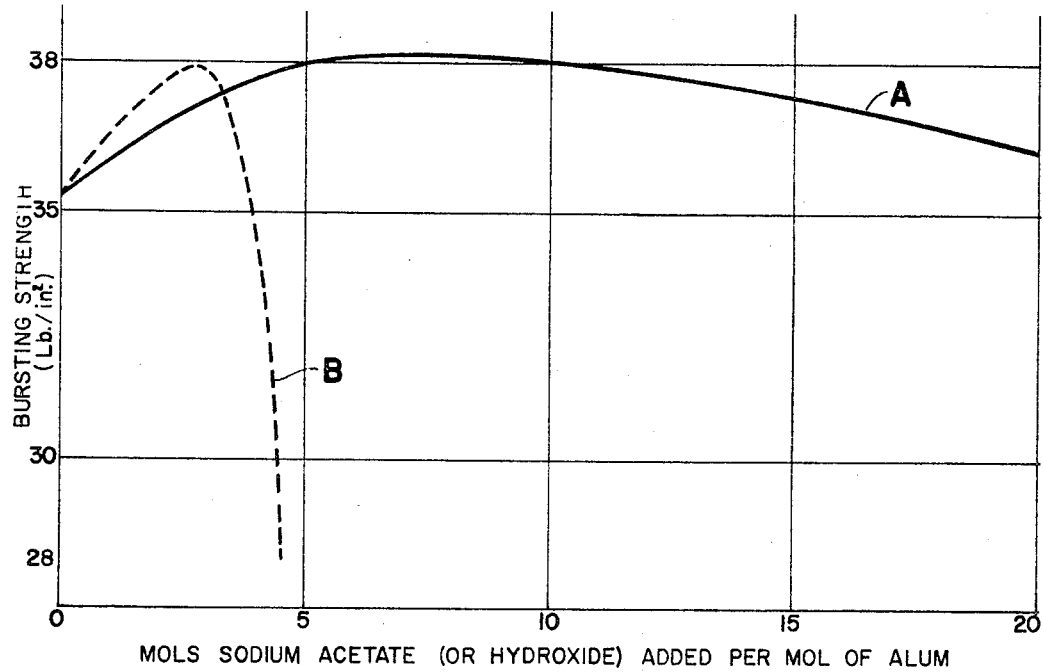
FIG. I
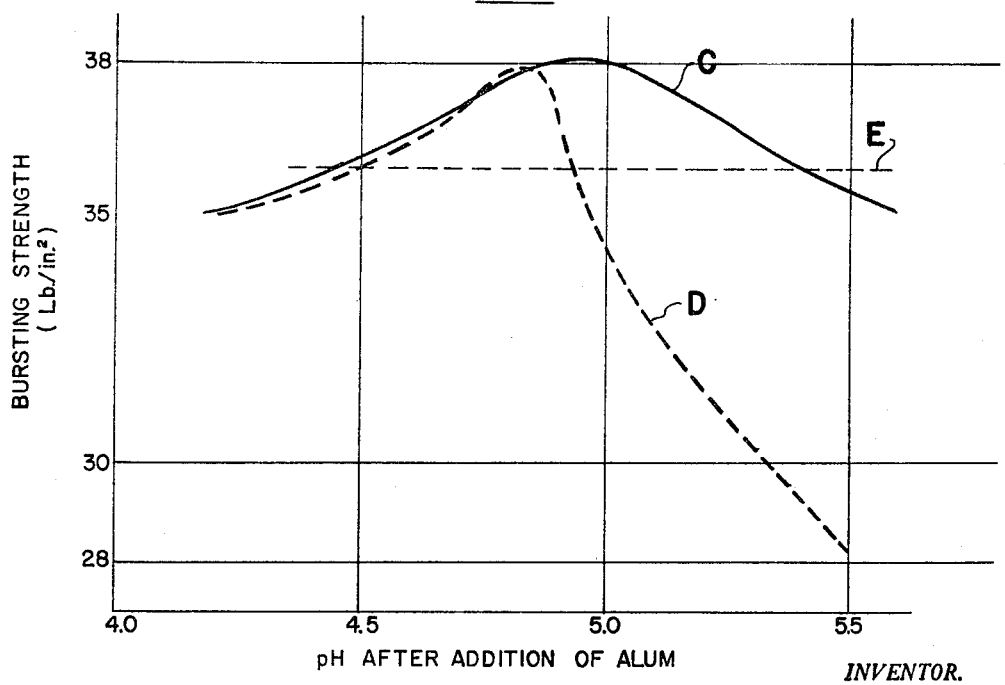
FIG. 2
INVENTOR.
WALTER F. REYNOLDS
WILLIAM F. LINKE
BY
ATTORNEY

3,269,891
FIXING DRY STRENGTH RESIN ON FIBERS BY ALUM IN THE PRESENCE OF A BUFFER

Walter Florus Reynolds and William Finan Linke, both of Stamford, Conn., assignors to American Cyanamid Company, Stamford, Conn., a corporation of Maine
Filed Aug. 31, 1965, Ser. No. 486,598
7 Claims. (Cl. 162—169)

This is a continuation-in-part of our copending applications Serial Nos. 44,671 and 334,080, filed July 22, 1960, and December 23, 1963.

The present invention relates to the manufacture of paper of improved dry strength by use of a water-soluble anionic dry strength resin fixed on the fibers by alum in the presence of a buffer, and to dry blends of one or more resins of this class with one or more normally solid buffers.

At the present time paper of improved dry strength is manufactured by forming an aqueous suspension of cellulose papermaking fibers, adding thereto an anionic dry strength resin and alum, and sheeting the suspension; see Azorlosa Canadian Patent No. 477,265 (1951). The paper possesses much better dry strength than normal paper and possesses virtually no wet strength, so that it is easily repulped.

It is a disadvantage of the process, however, that the paper is produced at the normal pH of alum solution (about 4.5). Paper produced at pH 4.5 is significantly acid and undergoes acid tendering on aging. Moreover, paper-making systems operating at that pH cause a significant amount of corrosion to the apparatus under conditions of constant use. As a result, efforts have been made to discover means for increasing the operating pH of papermaking systems producing dry strength paper of the type just described without sacrifice of the dry strength developed by the resin.

Up to the present, however, it has not been found possible to increase the system pH beyond about 4.7–4.8, as the addition of alkali to give a higher pH causes the strengthening effect of the resin to disappear abruptly. Repeated laboratory tests have shown that the resin-cellulose bond is weak when formed at pH values in excess of about 4.7.

The discovery has now been made that paper of improved dry strength resulting from a content of an anionic dry strength resin can be made at a pH substantially higher than heretofore considered feasible by adding the dry strength resin to a fibrous cellulose suspension having a dissolved content of a non-chelating acid having a dissociation content between $10^{-4}$ and $10^{-6}$ and mixtures of acids and salts can be used, having a water-soluble salt of said acid with a strong base as buffer, and alum. The present invention permits the manufacturing pH (the pH of the papermaking system) to be increased by about half a pH unit; without significant detriment to the dry strength of the paper produced.

By "non-chelating acid" is meant an acid which does not complex with dissolved polyvalent metal ions.

A particular advantage of the papermaking system of the present invention is that it broadens, and broadens upwardly, the pH range at which the resin is advantageously applied. Thus in the past, where sodium hydroxide has been generally used for pH control, the resin has exhibited an abrupt decline in efficiency when applied at a pH substantially in excess of about 4.7, so that to avoid the danger of too alkaline a system and yet avoid formation of undesirably acid paper, accurate control over the pH has proved necessary. The process of the present invention, however, applies the resin at high efficiency up to about pH 5.5, so that such accurate control of pH is no longer necessary.

More in detail, according to a preferred embodiment of the present invention there is first formed an aqueous suspension of cellulose papermaking fibers containing a suitable acid, a dissolved salt of the acid with a strong base as buffer, and alum, after which the dry strength resin is added. The resin is rapidly fixed on the fibers by the alum. Thereafter the suspension is sheeted in the usual manner to form paper.

The reagents may be added at any convenient point in the papermaking system. In practice, the acetic acid, acetic acid salt and alum are usually most advantageously added to the papermaking fibrous suspension in the beater, followed by the alum, and the dry strength resin is most advantageously added as near to the wire as possible, for example at the fan pump, sufficient time being preferably allowed in each instance for the added reagent to become uniformly distributed through the suspension before the next reagent is added.

Suitable buffer salts include the sodium, potassium, ammonium, magnesium, calcium, strontium and barium acetates, as well as organic acetates for example tetramethyl ammonium acetate and N-methylpyridinium acetate.

The amounts of acid and acid salt needed in any one instance as buffering system should be sufficient to maintain the pH of the suspension during addition of the alum at a pH above about 4.7, and in any one instance are most conveniently found by laboratory trial. Small amounts afford an improvement and large amounts are tolerated up to at least 20 mols in the case of sodium acetate which is generally sufficient to buffer the suspension at pH 5.3, so that evidently the invention does not depend upon critical ratios.

It will be understood that for purposes of the present invention one mol of a salt of for example acetic acid with a monovalent metal accomplishes the same results as are accomplished by half a mol of a salt of acetic acid with a divalent metal.

The acid salt or salts may be added in preformed state or may be formed in the fibrous suspension by separate addition of the acid and a base, for example, by addition of sodium hydroxide, sodium carbonate or sodium bicarbonate, or by addition of a soluble quaternary ammonium hydroxide, or by acidification of a suitable acetate with an acid material for example hydrochloric acid, sulfuric acid, alum, etc.

The water-soluble anionic dry strength resins are non-thermosetting vinyl resins essentially composed of substantially linear carbon chains carrying a major proportion of carbamul and a minor proportion of carboxyl or other acid (anionic) groups. Polymers of this type are made by copolymerizing a major proportion of acrylamide, methacrylamide, ethacrylamide, maleamide of other water-soluble vinyl amide with a minor proportion of acrylic acid, methacrylic acid, ethacrylic acid, maleic acid, maleamic acid, sulfostyrene, or any other water-soluble vinyl acid. Alternatively the resins are prepared by subjecting polyacrylamide, methacrylamide, etc., to a minor hydrolysis. They are used in sufficient amount to form strengthening bonds between the fibers when dry.

The polymers may contain diluent or spacing substituents such as ester groups, nitrile groups, and hydroxy groups resulting from a combined content of a minor amount of methyl acrylate, acrylonitrile, hydrolyzed vinyl acetate, or similar vinyl compounds copolymerizable with the principal monomers.

The invention does not depend upon the particular polymer employed in any one instance or on how it was made.

It is known that sized paper is manufactured by the beater addition of high molecular weight acids other than rosin, for example stearic acid, tall oil fatty acids and naphthenic acid, which are set on the fibers by the action of alum or other equivalent aluminum salts and which produce paper having properties closely similar to rosin sized paper. It appears that the process of the present invention will improve the sizing afforded by these agents as well.

The invention permits the incorporation in the pulp of such materials as heretofore have been added, for example, rosin size, ultramarine and titanium dioxide pigments, clay and dyes.

We have further found that dry blends of a major amount of a water-soluble anionic dry strength resin (such as disclosed above) and a minor amount of a material selected from the group consisting of the normally solid non-chelating acids having an ionization constant between $10^{-4}$ and $10^{-6}$, a salt of salt acid with a salt base, and mixtures thereof (buffers such as are disclosed above) permit the benefits of the present invention to be utilized in a simple, cheap and direct way. These blends dissolve in water forming clear solutions which can be added direct to paper pulp during normal manufacture of paper. Preferably the solution is added after the pulp has been treated with alum as mordant or retention agent for the polymer.

The invention will be more particularly described with reference to the examples which constitute specific embodiments of the invention and which are not to be construed as limitations thereon. Unless otherwise stated, percentages are based on solids on the dry weight of the fibers.

Example 1

The following illustrates the manufacture of paper according to the present invention by addition of an anionic polyacrylamide dry strength resin to a papermaking fibrous suspension containing alum and sufficient sodium acetate and acetic acid to buffer the suspension at a pH over the range 4.5–5.5 during deposition of the resin. The results as shown in comparison with those obtained by the process wherein a similar pH was obtained by use of sodium hydroxide, and no buffer was present.

An aqueous suspension was prepared at 0.6% consistency from a 1:1 by weight mixture of bleached sulfite: bleached hardwood kraft pulps. The suspension had a Canadian standard freeness of 500 cc. and a pH of 6.8. A series of aliquots was withdrawn.

To one set of aliquots was added sodium acetate in amounts shown in the table below, then 3% of alum (which converted part of the sodium acetate to acetic acid), and finally 0.5% of a neutral, aqueous solution of the water-soluble anionic dry strength papermaking resin formed by condensing 90 mols of acrylamide with 10 mols of acrylic acid.

To the second set of aliquots was added sodium hydroxide in amounts shown in the table below, followed by 3% of alum and 0.5% of dry strength resin as described above. All aliquots were gently stirred for a few minutes after each addition.

The pH values of the suspensions were determined before and after addition of the alum, and the values obtained are shown in the table. Addition of the dry strength resin caused no perceptible change in pH.

The aliquots were formed into handsheets by standard laboratory method at a basis weight of about 50 lbs. per 25″ x 50″/500 sheet ream, and the bursting strength of the paper was determined by the Mullen tester.

Results were as follows:

| Run No. | Mols Added [1] | | pH [2] | Percent Alum Added [3] | pH [4] | Percent D/S Resin Added [3] | Burst Strength,[5] lb./in. |
|---|---|---|---|---|---|---|---|
| | Sodium Acetate | NaOH | | | | | |
| 1 | 2.0 | None | 6.1 | 3.0 | 4.7 | 0.5 | 36.5 |
| 2 | 5.0 | None | 6.2 | 3.0 | 4.8 | 0.5 | 38.2 |
| 3 | 7.0 | None | 6.3 | 3.0 | 4.9 | 0.5 | 38.0 |
| 4 | 10.0 | None | 6.5 | 3.0 | 5.1 | 0.5 | 38.0 |
| 5 | 12.5 | None | 6.5 | 3.0 | 5.1 | 0.5 | 37.5 |
| 6 | 20.0 | None | 6.6 | 3.0 | 6.3 | 0.5 | 36.2 |
| 7 | None | 0 | 5.5 | 3.0 | 4.3 | 0.5 | 35.2 |
| 8 | None | 2 | 10.1 | 3.0 | 4.7 | 0.5 | 36.7 |
| 9 | None | 2.5 | 10.1 | 3.0 | 4.8 | 0.5 | 37.0 |
| 10 | None | 2.75 | 10.2 | 3.0 | 4.8 | 0.5 | 37.2 |
| 11 | None | 3.0 | 10.3 | 3.0 | 4.8 | 0.5 | 39.0 |
| 12 | None | 3.25 | 10.4 | 3.0 | 4.8 | 0.5 | 38.2 |
| 13 | None | 3.5 | 10.5 | 3.0 | 4.9 | 0.5 | 37.0 |
| 14 | None | 4.0 | 10.5 | 3.0 | 5.0 | 0.5 | 34.2 |
| 15 | None | 4.5 | 10.6 | 3.0 | 5.5 | 0.5 | 28.2 |

[1] Per mol of alum.
[2] Before addition of alum.
[3] Based on dry weight of fibers.
[4] After addition of alum.
[5] Adjusted to 50 lb. basis weight.

The results are plotted as smoothed curves in FIGS. 1 and 2.

In FIG. 1, a curve A is a plot of the dry strength obtained per mol of sodium acetate added, and curve B is a plot of the dry strength obtained per mol of sodium hydroxide added.

In FIG. 2, curve C is a plot of the dry strength obtained at various terminal pH values obtained by use of acetate buffer, and curve D is a plot of the dry strength obtained at various terminal pH values obtained by use of sodium hydroxide.

FIG. 1 shows that the dry strength obtained is not sharply dependent upon the amount of buffer present (curve A), but that poor dry strength is obtained when even a slight excess of sodium hydroxide is added over the optimum (curve B).

FIG. 2 shows that when acetate buffer is present (curve C), paper of dry strength can be made at a substantially higher pH than can be made at the same pH by use of sodium hydroxide alone (curve D). In FIG. 2, dotted guide line E shows that the presence of acetate buffer results in formation of paper at about pH 5.4 which has the same dry strength as paper produced at about pH 4.9 by use of sodium hydroxide, representing an increase of about half a pH unit.

Example 2

The procedure of Example 1 was repeated using calcium acetate in equivalent amount as the buffering agent. Substantially the same results were obtained.

Example 3

The following illustrates the desirability of adding the dry strength resin after (instead of before) the alum.

The procedure of run 6 of Example 1 was repeated as control, and the procedure was repeated except that the alum was added after the strength resin. In each run the pH after addition of the sodium acetate was 6.5 and the final pH was 5.2. Results were as follows:

| Run No. | Order of Addition | Burst Strength, lb./in.² | Percent Incr. |
|---|---|---|---|
| 1 | Acetate-resin-alum | 31.8 | |
| 2 | Acetate-alum-resin | 35.5 | 11.6 |

*Example 4*

The following illustrates the manufacture of paper of improved dry strength by the use of other buffer systems than the acetate system shown above.

The procedure of Example 1 is repeated except that the following buffers are respectively used in place of the acetate buffer of Example 1: propionic, butryric, benzoic, hydrazoic, and isobutyric. Results are substantially the same. The dissociation constants (pK values) of these buffers are between $1.4 \times 10^{-5}$ and $6.3 \times 10^{-5}$.

*Example 5*

The following illustrates the preparation of a dry blend of anionic dry strength resin and buffer according to the present invention.

A 90:10 acrylamide:acrylic acid dry strength resin (as sodium salt) is passed through a hammer mill and the −10 +40 mesh screen fraction is retained. The same procedure is performed with anhydrous sodium acetate. The resulting coarse powders are blended in 1:2 weight ratio.

The blend is stable for two months and is non-caking. It dissolves readily in warm water.

It confers superior dry strength when added to pulp to which has previously been added 3% of alum based on the dry weight of the fibers.

We claim:

1. A process for the manufacture of paper of improved dry strength which comprises first forming an aqueous suspension of cellulose papermaking fibers having a dissolved content of a non-chelating acid having an ionization constant between $10^{-4}$ and $10^{-6}$ and a dissolved salt of said acid with a strong base as buffer, and alum, then adding a water-soluble anionic dry strength resin, and finally sheeting said suspension to form paper; the amount of said resin being sufficient to form strengthening bonds between said fibers when dry, the amount of said alum being sufficient to fix at least a substantial part of said resin on said fibers, and the amount of said dissolved buffer being sufficient to buffer the pH of the suspension above 4.8 during deposition of a preponderant proportion of said resin.

2. A process for the manufacture of paper of improved dry strength which comprises first forming an aqueous suspension of cellulose papermaking fibers having a dissolved content of acetic acid, a dissolved salt of acetic acid with a strong base as buffer, and alum, then adding a water-soluble anionic dry strength resin, and finally sheeting said suspension to form paper; the amount of said resin being sufficient to form strengthening bonds between said fibers when dry, the amount of said alum being sufficient to fix at least a substantial part of said resin on said fibers, and the amount of said dissolved buffer being sufficient to buffer the pH of the suspension above 4.8 during deposition of a preponderant proportion of said resin.

3. A process according to claim 2 wherein the resin is a 90:10 molar ratio acrylamide:acrylic acid copolymer.

4. A process according to claim 2 wherein the salt of acetic acid is sodium acetate.

5. A process according to claim 2 wherein the salt of acetic acid is calcium acetate.

6. A process according to claim 2 wherein the acetic acid and the salt of acetic acid are present in amounts sufficient to buffer said suspension at a pH in the range of 4.8–5.2.

7. A process for the manufacture of paper of improved dry strength which comprises first forming an aqueous suspension of cellulose papermaking fibers containing acetic acid and a dissolved salt of acetic acid with a strong base, then adding alum, thereafter adding a water-soluble anionic dry strength resin, and finally sheeting said suspension to form paper; the amount of said resin being sufficient to form strengthening bonds between said fibers when dry, the amount of said alum being sufficient to fix said resin on said fibers, and the amount of said acetic acid and acetic acid salt being sufficient to buffer said suspension above 4.7 during said process.

References Cited by the Examiner

UNITED STATES PATENTS

| | | | |
|---|---|---|---|
| 2,166,330 | 7/1939 | Vincent | 162—76 |
| 2,566,149 | 8/1951 | Strain | 260—80 |
| 2,843,479 | 7/1958 | Piersol | 162—182 |
| 3,141,815 | 7/1964 | Manley | 162—164 |
| 3,186,900 | 6/1965 | De Young | 162—164 |
| 3,197,447 | 7/1965 | Tealet | 260—80 |

DONALL H. SYLVESTER, *Primary Examiner.*

H. R. CAINE, *Assistant Examiner.*